March 21, 1933.  A. G. HUMPHREYS  1,902,404

MEANS FOR ASSISTING AND TESTING THE MEMORY

Filed Feb. 27, 1930

INVENTOR.
A. G. Humphreys.
By Lacey & Lacey,
Attys.

Patented Mar. 21, 1933

1,902,404

UNITED STATES PATENT OFFICE

AUSTIN GEORGE HUMPHREYS, OF BRIGHTON, ENGLAND

MEANS FOR ASSISTING AND TESTING THE MEMORY

Application filed February 27, 1930, Serial No. 431,946, and in Great Britain March 27, 1929.

This invention relates to means for assisting and testing the memory, more especially for educational purposes, such means being also applicable to educational games and the like.

It has before been proposed to provide a device for educational purposes consisting of a number of blocks, discs or pieces bearing the letters of the alphabet or other signs or words and so constructed that they can be assembled only in a predetermined order and position. In one form the discs are shaped to form a segment of a circle of greater dimensions than a semi-circle, each disc having in its peripheral edge a semi-circular or other indentation arranged to fit a corresponding projection formed in a recess designed to receive the disc in a tablet or base member, the indentations of different discs being differently disposed in the periphery thereof so that each disc will fit only into one of the recesses aforesaid.

The present invention has for its object to provide improved, simple and effective means for the purpose referred to.

According to the invention, the improved means comprises a series of base members or sections, such as flat plates, blocks or the like of cardboard or other suitable material, and a corresponding series of elements or parts, conveniently of similar material, each of the base members or sections being formed with a transverse channel the edges of which are so shaped or arranged in relation to each other that the corresponding element or part shaped to fit into the channel will not fit into the channel of any of the other base members or sections of the series, each pair of corresponding parts having respectively indicated thereon in any suitable manner a question and the correct answer thereto. The means according to the present invention is of special utility for use in teaching children simple arithmetic, multiplication, currency, measure and other tables and the like, and also history, geography, spelling, grammar, English, languages, mathematical formulæ and other subjects. If the answer to a question has not been memorized, the correct answer can be ascertained by trial of the elements or parts in the recesses or the like in the base member or section upon which the question is indicated. On the other hand, if the answer to the particular question is known, the correct element or part can be selected and inserted or fitted in position without previous trial of other elements or parts, and there is therefore an incentive for a child to memorize the answers to avoid the necessity of finding the correct element or part by trial. One or both of the edges of the transverse channel in each base member or section is or are of curved, sinuous or other irregular formation, the corresponding elements or parts being similarly shaped to fit into the transverse channels. Preferably, the base members or sections bear the questions and the elements or parts aforesaid have the respective answers indicated thereon, but, if desired, the reverse arrangement may be adopted. In a simple method for the production of a series of base members or sections and the corresponding elements or parts, a strip of cardboard or other suitable material is cut from end to end along two spaced lines, and the outer portions of the strips so severed are fixed upon a suitable backing strip, the assembly being then subdivided transversely into the required number of parts or sections, the cutting lines or the lines of sub-division, or both, being so arranged that all the parts or sections of the assembly have recesses and co-operating elements or parts of different form. Conveniently, one or both of the cutting lines is or are of regular sinuous or undulatory form and the cutting lines are spaced at a constant mean distance apart, the transverse lines of sub-division being spaced irregularly with respect to the spacing or pitch of the undulations of the cutting lines, so that the channels in the series of base members or sections produced are of different form, further and different series being readily obtained by varying the longitudinal position of one of the sinuous or undulatory cutting lines with respect to the other before the assembly of strips is sub-divided, such cutting lines being determined by the use of a template or templates or by a die or other suitable means. If desired, the series of base members or sections may be provided in the form of a strip or unit produced, for example, as herein described. The use of curved sinuous or undulatory cutting lines is particularly advantageous in that the shape of the resulting channels in the base members or sections affords comparatively little guidance in the selection of the corresponding elements or parts to fit thereinto.

The invention is hereinafter described, by way of example, with reference to the accompanying diagrammatic drawing, in which:—

Figures 1, 2:
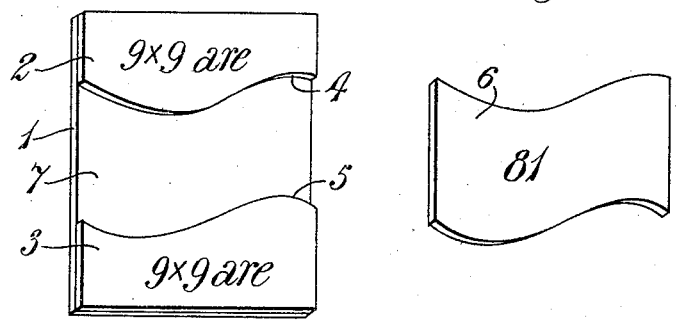
Figure 1 is a perspective view of a base member according to the invention.
Figure 2 is a similar view of the element or part for co-operation therewith.

In carrying the invention into effect according to a simple preferred construction, the improved means according to the invention comprises a plurality of base members each consisting of a flat backing 1 of cardboard or the like having two spaced parts 2, 3 fixed upon its upper face, and having their adjacent edges 4, 5 respectively of curved, sinuous or other irregular form. The base members so provided have indicated thereon questions, the answers to which are indicated upon corresponding elements such as 6, Figure 2, adapted to fit into the channel 7, in the respective base member. Thus, the base member may, for example, bear the question "9 × 9 are", the corresponding element 6 bearing the answer "81". The transverse channels 7 in the base members are so formed that each element 6 is capable of being fitted only into the corresponding base member. For this purpose, the parts 2 and 3 and the element 6 advantageously are formed in the manner hereinafter described.

Figure 3:
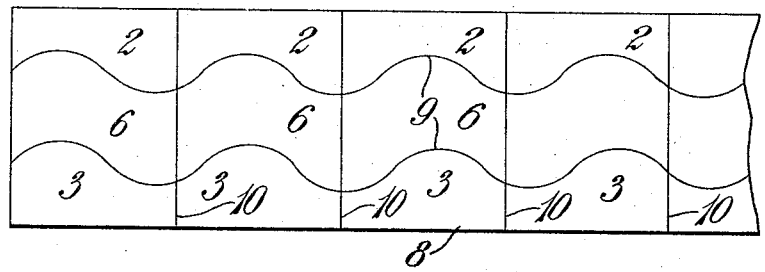
Figure 3 is a diagram illustrating a preferred method of forming a single series of base members and co-operating elements.

As shown in Figure 3, a strip 8 of cardboard or the like is inscribed from end to end with a pair of spaced sinuous lines 9, such lines being of a regular undulatory character and being parallel disposed. The strip is cut along the lines 9 and the outer parts 2, 3 are applied and fixed, as by means of an adhesive, upon a similar strip forming the backing 1. The intermediate portion of the strip from which the elements 6 are formed is located in position between the parts 2 and 3 and the assembly is then sub-divided transversely upon the lines 10, such lines 10 being spaced irregularly with respect to the spacing or pitch of the undulations of the cutting lines 9, so that the transverse channel 7 in each base member so produced is of different formation from that of all the remaining channels. By such an arrangement of curved lines it is impossible for any one of the elements 6 to be fitted or even dropped into any other channel 7 than that in the corresponding base member. The method shown in Figure 3 is suitable for the production of a series which is comparatively small in number.

Figure 4:
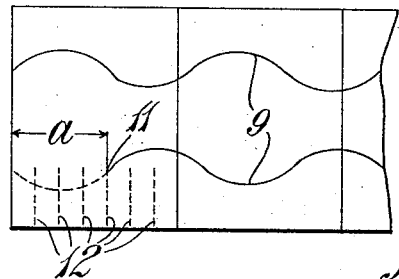
Figure 4 is a view similar to Figure 3, illustrating the manner in which further series of base members and co-operating elements may be formed.

If further series of base members and elements are required, these may be produced in a similar manner by moving or setting one of the sinuous cutting lines 9 longitudinally with respect to the other. Thus, in Figure 4, the cutting lines 9 are offset by distance $a$ to produce a different series from that shown in Figure 3, while, by setting the end 11 of the respective line 9 at any one of the other positions indicated by the dotted lines 12, additional and different series of base members and cooperating elements may be produced in the manner before described. For example, as shown in Figure 4, eight different series may be obtained. Thus, if each series contains eight separate base members and co-operating elements, the total number of base members and elements will be 64, all of which will be different from one another.

It will be understood that the invention is not limited to the particular embodiment hereinbefore described. For example, similar effects may be secured by providing the cutting lines 9 of shallow toothed or serrated or other formation, or by providing the transverse channel 7 with one straight edge and one curved or sinuous edge. Furthermore, the base members and the respective elements or parts may be made of wood, metal or other material and may be produced by sawing, stamping, casting, pressing or other suitable or convenient means.

It will furthermore be understood that the invention is applicable to various purposes, other than those hereinbefore specified. For example, it may be used for teaching the reading of maps, the elements or parts bearing duplicate parts of the maps with names or other required indications thereon.

What I claim is:—

An educational appliance comprising a plurality of rectangular blocks of uniform peripheral dimensions, a transverse channel extending completely across one face of each block between two ends so that each block consists of two parts the full thickness of the block separated by an integral part which is thinner, the edges forming the junctions of the said parts being sinuous, the transverse channel of one block being distinct from that of any other block, and a plurality of elements each having a longitudinal dimension corresponding to a transverse dimension of one of said blocks and each formed with longitudinal sinuous edges and straight transverse ends, the sinuous edges of such elements being such that each element has its own characteristic configuration so that it has to be fitted into one of said channels of a predetermined block, the said elements bearing matter which is complementary to matter formed upon the said blocks, and their transverse end edges coinciding with the straight edges of the blocks.

AUSTIN GEORGE HUMPHREYS.